(12) United States Patent
Gatewood, Jr. et al.

(10) Patent No.: US 7,564,455 B2
(45) Date of Patent: Jul. 21, 2009

(54) GLOBAL VISUALIZATION PROCESS FOR PERSONAL COMPUTER PLATFORMS (GVP+)

(75) Inventors: Walter P. Gatewood, Jr., Lexington Park, MD (US); Ingi A. Ford, Great Mills, MD (US); Bryan M. Vandrovec, Great Mills, MD (US); Donald G. Mielcarek, Lexington Park, MD (US); David A. Kirkpatrick, Solomons, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 512 days.

(21) Appl. No.: 11/296,723

(22) Filed: Dec. 6, 2005

(65) Prior Publication Data

US 2006/0146053 A1 Jul. 6, 2006

Related U.S. Application Data

(63) Continuation-in-part of application No. 10/255,413, filed on Sep. 26, 2002, now Pat. No. 7,239,311.

(51) Int. Cl.
| G06T 15/00 | (2006.01) |
| G06T 17/00 | (2006.01) |
| G09G 5/00 | (2006.01) |
| G06F 3/00 | (2006.01) |

(52) U.S. Cl. .................. 345/419; 345/428; 345/582; 345/660; 715/721

(58) Field of Classification Search ............... 345/428, 345/660–671, 418, 419, 420
See application file for complete search history.

(56) References Cited

U.S. PATENT DOCUMENTS

| 5,694,533 | A | * | 12/1997 | Richards et al. ............. 345/420 |
| 5,862,252 | A | * | 1/1999 | Yamamoto et al. .......... 382/154 |
| 6,417,860 | B1 | * | 7/2002 | Migdal et al. ................ 345/582 |
| 6,448,969 | B1 | * | 9/2002 | Minakawa et al. .......... 345/428 |
| 6,504,535 | B1 | * | 1/2003 | Edmark ....................... 345/419 |
| 6,559,842 | B1 | * | 5/2003 | Deering et al. .............. 345/420 |
| 6,628,277 | B1 | * | 9/2003 | Deering et al. .............. 345/419 |
| 6,891,546 | B1 | * | 5/2005 | Park et al. ................... 345/552 |
| 7,012,614 | B2 | * | 3/2006 | Chalfin et al. ............... 345/582 |
| 7,038,694 | B1 | * | 5/2006 | Santodomingo et al. .... 345/582 |
| 7,071,935 | B1 | * | 7/2006 | Deering et al. .............. 345/419 |
| 7,085,683 | B2 | * | 8/2006 | Anderson et al. ........... 702/186 |
| 7,096,428 | B2 | * | 8/2006 | Foote et al. ................. 715/721 |
| 7,250,944 | B2 | * | 7/2007 | Anderson et al. ........... 345/419 |
| 7,343,268 | B2 | * | 3/2008 | Kishikawa .................... 703/1 |

* cited by examiner

*Primary Examiner*—Ryan R Yang
(74) *Attorney, Agent, or Firm*—Mark O. Glut

(57) ABSTRACT

A system and process that incorporates hardware and software as elements to be combined with procedures and processes to obtain, format, store, combine, control, display, record, and visualize dynamic scenarios by interacting with accurate, realistic models and actual events within, on, and above a three-dimensional surface to be observed or modeled. The present invention software and process is capable of displaying extremely high resolution terrain models and imagery in real time over the entire surface of the planet, as well as a large number of moving entities and their associated graphical models. These features, combined with a network application programming interface (API), make the present invention suitable for flight simulation out-the-window displays, command and control scenarios, and mission review or rehearsal.

17 Claims, 7 Drawing Sheets

GLOBAL VISUALIZATION PROCESS FOR PERSONAL COMPUTER PLATFORMS (GVP+)

CROSS REFERENCE TO RELATED APPLICATIONS

This application is a continuation-in-part, and claims the benefit, of U.S. Nonprovisional application Ser. No. 10/255,413, filed on Sep. 26, 2002, now U.S. Pat. No. 7,239,311 which is incorporated herein by reference. Applicants claim the priority date benefits of that application.

STATEMENT REGARDING FEDERALLY SPONSORED RESEARCH OR DEVELOPMENT

The invention described herein may be manufactured and used by or for the Government of the United States of America for governmental purposes without payment of any royalties thereon or therefor.

REFERENCE TO A SEQUENCE LISTING, A TABLE, OR A COMPUTER PROGRAM LISTING COMPACT DISK APPENDIX

Incorporated by reference is a computer program listing consisting of a listing of program files (attached hereto as Appendix A) and an electronic copy of this listing of program files and the source files of the present invention, which are being submitted concurrently herewith on a compact disc labeled by at least the title and the name of the inventors associated with this Application. On the "computer program listing appendix" compact disc, Appendix A is contained within the file named "APPENDIX_A_PROGRAM_LISTING_LIS" (having a size of 61922 bytes), and the source code is contained within the folder named "GVP" (having a size of 70798819 bytes).

BACKGROUND OF THE INVENTION

1. Field of the Invention

The parent invention pertains to optimum visualization of complex scenarios, in particular, a large-scale display with user-adjustable resolution and viewpoints of these scenarios as events occur in real time over a wide geographic area. The parent, i.e., the Global Visualization Process (GVP) system (as described in U.S. Nonprovisional application Ser. No. 10/255,413, filed on Sep. 26, 2002) is an integrated software solution for high-performance visualization. The GVP software is capable of displaying extremely high-resolution terrain models and imagery in real time over the entire surface of the planet as well as a large number of moving entities and their associated graphical models. More specifically, the present invention Global Visualization Process and System (GVP+) of this Application, similarly pertains to the optimum visualization of complex scenarios, preferably, in association with local or remote displays having user-adjustable resolution and viewpoints, and preferably as these scenarios (and/or information events) occur or change in real time over some user-determined geographic area(s). Furthermore, the process and system of the Global Visualization Process and System (GVP+) is comprised of an integrated software solution for high-performance visualization—for use in, or with, at least personal computer platforms. Still further, the GVP+ software is capable of displaying extremely high-resolution terrain models and imagery in real time over the entire surface of the planet, as well as a large number of moving entities and their associated graphical models. Moreover, while the present invention employs at least some portion of the original GVP process and system software (as described in U.S. patent application Ser. No.: 10/255,413) as a starting point, and while essentially, if not totally, achieving the same process functions, the present invention incorporates new capabilities, functions differently, and is also crafted to operate efficiently in other equipment including, but not limited to, the class of data-processing equipment known as Personal Computers.

2. Description of the Related Art

Flight simulation has proved to be an effective method for crew and mission training. An integral component of flight simulation is the out-of-the-window visual scene. The creation of a GVP visualization or visual database for flight simulation (or for mission planning and rehearsal or for other applications such as command and control display systems) typically begins with real-world source data that has been derived from satellite imagery, overhead photography, U.S. Geological Survey information or mapping source materials. The conventional approach until very recently (now still employed in order to comply with limited computer resources) has been to construct a visual environment from representative artificial models and modeled elements to meet specific training objectives.

And, while a graphics arts constructed visual database system may be very effective for a particular training application, it should also be appreciated that there are many diverse situations where a fully representative visualization system which renders real-world data, unlimited in resolution, scale, and represented area, would be desirable. GVP offers a general-purpose visualization system that does not need to be redesigned for each new project or set of training exercises.

The Global Visualization Process (GVP) of the invention, as described in U.S. patent application Ser. No.: 10/255,413, and the GVP+ described herein, accomplish what conventional methods and systems cannot. In the context of an integrated system having complementary components for large-scale real time visualization, the GVP and GVP+ can display large-scale terrain modeling and simulation depictions, in user selectable resolution, without the numerous drawbacks of conventional systems. Conventional systems suffer from some or all of the following limitations:

- Highly specific processes and model data formats limit the range of data inputs to a small subset of available information;
- Video outputs are limited to specific display devices or types;
- Stereoscopic viewing is not supported or is not controllable;
- Overall size of operating terrain models is restricted to small areas and the greater the detail (resolution), the smaller the area displayed;
- When put in motion, as in flight simulation or when the depiction eyepoint is moved, model depiction has unacceptably low update rates;
- Small numbers of fixed or mobile objects added to the terrain model grossly and unacceptably inhibit the video update rate;
- Model construction and image computation based on fundamental flat-earth geometry introduces gross positional errors with complex variations in magnitude—these errors confound operations when independent systems interact;

Without major revisions to adapt to multi-processor and multi-pipe computer systems, existing software architecture does not fully exploit state-of-the-art graphics-oriented computers; and Conventional systems cannot employ imagery and terrain geometry of mixed resolution, or can do so only with difficulty.

Accordingly, there is a need for a system and/or process for producing visual databases that utilize(s) the great improvements in speed, area, resolution, and video display output while preserving the accuracy of the input data. Furthermore, as the GVP and GVP+ were being developed to meet this need, their specialized properties were determined to provide solutions to many more applications.

SUMMARY OF THE INVENTION

While the following describes the Global Visualization Process system (GVP), the same description, unless specifically noted otherwise, may also apply to the Global Visualization Process for Personal Computer Platforms (hereinafter referred to as Global Visualization Process and System, or GVP+) as well; therefore the use of the terms Global Visualization Process, GVP, or any other associated term should also be considered to refer to or describe the Global Visualization Process and System (GVP+) where appropriate.

The Global Visualization Process (GVP) system is an integrated software solution for high-performance visualization. GVP software is capable of displaying extremely high-resolution terrain models and imagery in real time over the entire surface of the planet, as well as a large number of moving entities and their associated graphical models. The system can display imagery at 2 cm/pixel, and infinitely detailed terrain in real time over the whole surface of the planet earth. All displayed data is referenced to the World Geodetic System 1984 (WGS-84) ellipsoid for true round-earth effects, and can be rendered in correct asymmetric stereo. These features, combined with a network application programming interface (API), make GVP suitable for flight simulation out-the-window displays, command and control scenarios, and mission review or rehearsal.

The Global Visualization Process (GVP) enables accurate and rapid visualization of a wide area that may include ongoing complex military maneuvers comprising extensive spatial and temporal gradients. GVP combines actual imagery, geometric relationships and stored map data, with location and activity information for both mobile and fixed objects to generate and control display of large-scale visual depictions (visualizations). GVP integrates data using full external network connectivity for both simulations and actual operations.

Applications include human visualization for command and control of military operations, tests, training, reconnaissance and surveillance, simulations, mission rehearsal, war games and synthetic vision systems. GVP produces high quality displays having dynamic and perceptual properties matched to user needs while providing immediate use of acquired data. GVP can be adapted for use by a single person, such as a virtual image display, or large group displays, such as theaters. GVP may provide standard two-dimensional outputs or stereoscopic depictions thus matching a user's perceptual requirements for complex events and spatial interactions, such as may occur in war games.

A preferred embodiment of the GVP provides a system and process that incorporates hardware and software as elements to be combined with procedures and processes to obtain, format, store, combine, control, display, record, visualize and interact with accurate, realistic models and events within, on, above and below a three-dimensional surface to be observed or modeled.

A preferred embodiment of the GVP discloses a process for dynamic human visualization of events occurring within a volume having varying spatial and temporal gradients, which provides readily adjustable scale and resolution, and initiating activities internal thereto. A preferred embodiment of the process comprises: 1) acquiring data that represents imagery, geometric and time relationships to be used for generating motion paths, stored maps, location, and activity, and the data is acquired from standard sources; 2) integrating the data using full external network connectivity—the data is acquired from simulations, actual events or standard sources and the data includes multi-source satellite and aerial imagery available in various wavelengths and formats; 3) developing at least one database, having a software architecture from which at least one model is generated; 4) generating at least one display containing at least one depiction from said at least one model and said data, wherein said depiction may be displayed in real time; and 5) controlling said at least one display.

A preferred embodiment of the GVP discloses a system, having inputs, and outputs, that enables a process for dynamic human visualization of a volume, including events having varying spatial and temporal gradients that are occurring within the volume. The system provides readily adjustable scale and resolution and initiating activities internal thereto. The system comprises: 1) at least one data generator as at least one source of data—the data represents imagery, geometric and time relationships to be used for generating motion paths, stored maps, location, and activity and the data is acquired from standard sources; 2) memory for storing and accessing at least a portion of the data; 3) at least one interface for communication between the system and external devices; 4) at least one visualization device, having inputs and outputs, for displaying at least one depiction—the depiction may be derived at least in part from a model, having at least one input and at least one output, and is displayed in real time; 5) at least one record and playback device for provision of at least some inputs to the visualization device; 6) software for manipulating the process—the software is used to generate at least one database; the software is used at least in part to create at least one model from the database; the software is used to control the inputs to and the outputs from at least one model for inputs to at least one display; and the software is used to control the outputs from the record and playback device and the interface; 7) at least one controller for controlling said inputs and outputs to the system. Moreover, in a more preferred embodiment, the data generator comprises at least one device such as a real time data collection system, a GCCS system, a scenario generator, a device simulator or a cockpit simulator.

A preferred embodiment of the system and process includes using quad tree architecture for terrain geometry files and clip texture imagery, a Master Object Manager to separate objects, and a geographical coordinate system, such as WGS-84, to convert the imagery into one global model.

Using the quad tree architecture allows management of both position and resolution variations within the clip texture files and the terrain geometry files and facilitates the population of at least one worldwide database. The resolution of the display can be adjusted for varying eyepoints with a first adjustment possibly defining a first level of a plurality of levels within the quad tree architecture. Each succeeding level of the plurality of levels consists of four sub-sectors each depicting a quarter of the area of the depiction of an immediately preceding level but containing the same amount of image data as the depiction of the immediately preceding level, thus providing higher resolution than any of the preceding levels. Further, moving through the plurality of levels, in either direction, provides a resolution required by a user.

The Master Object Manager module having software architecture, interfaces to outside events and collects communication and control processes. The Master Object Manager can interact with standards-based processes such as distributed interactive simulation (DIS), Department of Defense (DoD) systems under High Level Architecture (HLA), Defense Information Infrastructure Common Operating Environment (DII-COE) formats for the Global Command and Control System (GCCS), and commercial computer network communications protocols. The software architecture of GVP with the Master Object Manager achieves update rates facilitating real time viewing on the display and permits a user's areas of interest to be embedded at a pre-selected resolution. The system accepts data in formats such as DII-COE messages in GCCS-M, Combat Command and Control System, HLA, DIS, military LINK, and air traffic control radar or any combination thereof.

Accurate and rapid visualization of an area via orienting position is based on the WGS-84 geophysical standard for world shape to at least one eyepoint. The WGS-84 geophysical standard is fully compatible with standard navigation systems and included within the desired area are events having a range of spatial and temporal gradients. Also, systems operating to the WGS-84 permit navigation systems to connect, register, and synchronize within the process. As a result, the accuracy of the data received by the system is preserved.

Initially, the GVP and GVP+ addressed the need to depict complex military flight test operations. For planning, controlling, and assessment, the need for rapid clear communication between all concerned could be met only by some method of advanced visualization. Thus, the GVP and GVP+ address or otherwise meet the following needs:

Accepts data inputs or source material from a large variety of available information for terrain model construction—this includes map data, image data and terrain shape data;
Provides a range of data inputs suitable for a large variety of available information;
Provides for video outputs to a variety of display devices;
Provides for stereoscopic viewing;
Provides for operating terrain models of large areas at suitable resolution for human interpretation;
Provides for ready updating of dynamic model depiction, particularly useful in flight simulations or when the eyepoint is changed;
Provides a usable video update rate even when large numbers of objects are added;
Calculations and model construction are based on round-earth geometry, eliminating positional errors;
Software architecture fully exploits state-of-the-art graphics-oriented computers; and
Readily employs imagery and terrain geometry of mixed resolution.

Advantages of preferred embodiments of the GVP and/or GVP+, as compared to conventional systems, preferably include permitting:

Accurate and rapid visualization of a wide area;
Visual capture of activity involving extensive spatial and temporal gradients;
Merging of actual imagery, geometric relationships and stored map data, with location and activity information;
Generation and control of the display of large-scale visualizations;
Integration of data using full external network connectivity;
Production of displays meeting a user's dynamic and perceptual requirements;
Immediate use of acquired data;
Adaptation for use by a single person or a large group;
Standard two-dimensional outputs or fully stereoscopic depictions;
Support for both simulations and actual operations in real time;
Simplified design of alternate configurations;
Improved robustness;
Increased flexibility; and
Ready upgradeability.

Preferably, the embodiments of the GVP and/or the GVP+ can be applied to depict any activity requiring a decision maker to undertake one or more of the following actions: plan, coordinate, control, communicate, command, assess, reconnoiter, negotiate, direct, collate, organize, or terminate activities, or any action related to any of the above, either before or after in time. Sample activities include military flight test operations, training, simulations, tests, computer modeling, war games, maneuvers, combat operations, flight guidance or vehicle guidance and domestic disturbances. The realistic training available with the system saves capital equipment, as well as training and maintenance costs, while providing a better-trained individual. It will also provide top-level decision makers with very realistic "hands-on" experience without the expense of participating in an event that could cost lives and material.

Similarly, and preferably, the Global Visualization Process and System (GVP+) is an integrated software solution for high-performance visualization. Preferably, the GVP+ software is capable of displaying extremely high-resolution terrain models and imagery in real time over the entire surface of the planet, as well as a large number of moving entities and their associated graphical models. The GVP+ can display imagery and detailed terrain in real-time over the whole surface of the planet earth with a much higher resolution than that possible with the parent GVP. This is preferably accomplished without using clip texture files, and, preferably, the number of levels in the visual database structure is not constrained to 32. All displayed data is referenced to the World Geodetic System 1984 (WGS-84) ellipsoid for true round-earth effects, and can be rendered in correct asymmetric stereo. These features, combined with a network application programming interface (API), make the GVP+ suitable for flight simulation out-the-window displays, command and control scenarios, and mission review or rehearsal. Moreover, the GVP+ enables accurate and rapid visualization of a wide area that may include ongoing complex military maneuvers comprising extensive spatial and temporal gradients. Preferably, the GVP+ combines actual imagery, geometric relationships and/or stored map data, with location and activity information for both mobile and fixed objects, to generate and control the display of visual depictions (Visualizations), including, but not limited to, large-scale visual depictions. And the GVP+ preferably integrates data using full external network connectivity for both simulations and actual operations. In general, the GVP+ applications include, but are not limited to, human visualization for command and control of military operations, tests, training, reconnaissance and surveillance, simulations, mission rehearsal, war games, and synthetic vision systems. Moreover, GVP+ preferably produces high quality displays having dynamic and perceptual properties matched to a user's needs while providing virtually immediate use of acquired data. Furthermore, the GVP+, preferably, can be adapted for use by a single person (e.g., such as with portable (or hand-held) virtual image displays), or for large groups (e.g., such as in theaters), and the GVP+ preferably provides standard two-dimensional outputs, simulated three-dimensional outputs, and/or stereoscopic depictions, thus matching a user's perceptual requirements for complex events and spatial interactions, such as those that may occur in (or be required for) war games.

Preferably, the present invention: should provide a system and/or process that incorporates hardware and software as elements to be combined with procedures and processes to obtain, format, store, combine, control, display, record, visualize and interact with accurate, realistic models and events within, on, above and/or below, a two and/or three-dimensional surface to be observed and/or modeled. More specifically, the process preferably comprises the following steps:

Acquiring data that represents imagery, geometric and time relationships to be used for generating motion paths, stored maps, location, and activity, and the data is acquired from standard sources;

Integrating the data using full external network connectivity—the data is preferably acquired from simulations, actual events or standard sources and the data includes multi-source satellite and aerial imagery available in various wavelengths, forms, and/or formats;

Developing at least one database, preferably using a software architecture from which at least one model is generated;

Generating at least one display containing at least one depiction from said at least one model and said data, wherein said depiction may be preferably displayed in real time; and Controlling said at least one display.

Still more specifically, the present invention preferably discloses a system (having inputs and outputs) that enables a process for dynamic visualization of a "volume," and which preferably includes, but is not limited to, displaying (or processing) events having varying spatial and temporal gradients that are occurring within the "volume." Moreover, the system preferably provides a readily adjustable scale and resolution capability, and a capability of initiating activities internal thereto. Moreover, the system preferably comprises at least some, if not all, of the following:

At least one data generator and/or at least one other source of data—in general, the data represents imagery; geometric and time relationships to be used for generating motion paths; stored maps; location(s); and activity, and the data is preferably acquired from standard sources;

Memory for storing and accessing at least a portion of the data;

At least one interface for communication between the system and external devices;

At least one visualization device, having inputs and outputs, for displaying at least one depiction of the information and/or data—in general, the depiction may be derived at least in part from a model that is preferably capable of being displayed in real time;

At least one record and/or playback device, for the provision of at least some inputs and/or outputs to the visualization device;

Software for manipulating the process—in general, the software can be used to at least: generate at least one database; create at least one model from the database; control the inputs to (and the outputs from) at least one model; provide at least one input to at least one display; and control the outputs from the record and playback device and the interface; and At least one controller for controlling said inputs and outputs to the system.

Moreover, in at least one embodiment of the GVP+, the data generator preferably comprises at least one device (process or means) such as a real time data collection system, a GCCS system, a scenario generator, a device simulator, a cockpit simulator, or some other similar or appropriate device, process or means.

Additionally, the GVP+ preferably includes: the use of quad tree architecture for terrain geometry files and/or imagery files; a Master Object Manager to separate objects; and a geographical coordinate system, such as WGS-84, to convert the imagery into at least one global model. Moreover, the use of quad tree architecture preferably allows for the management of both position and resolution variations within the imagery files and/or the terrain geometry files, and preferably facilitates the population of at least one worldwide database. Furthermore and preferably, the resolution of a display can be adjusted for varying eyepoints—with a "first adjustment" preferably defining a first level, of a plurality of levels, within the quad tree architecture. Moreover, the present invention is preferably capable of providing higher resolution in each succeeding level of display, since each succeeding level, of the plurality of levels, consists of four sub-sectors that each depict a quarter of the area of the depiction of an immediately preceding level, but contain the same amount of image data as the depiction of the immediately preceding level. Still further, moving through the plurality of levels, in either direction, preferably provides the resolution required by a user.

Similarly, as with the GVP, the GVP+ and/or the Master Object module of the GVP+ has at least one software architecture interface to outside events, and collects communication and control processes. Preferably, the GVP+ (and/or) the Master Object Manager can interact with standards-based processes such as: distributed interactive simulation (DIS); Department of Defense (DoD) systems under High Level Architecture (HLA); Defense Information Infrastructure Common Operating Environment (DII-COE) formats for the Global Command and Control System (GCCS); and/or commercial computer network communications protocols. However, the GVP+ and/or the Master Object Manager of the present invention are not limited to such systems, processes, formats, protocols and/or platforms. In other words, the GVP+ is preferably capable of accepting data in formats such as DII-COE, messages in GCCS-M, Combat Command and Control System, HLA, DIS, military LINK, and/or air traffic control radar or any combination thereof; however, the GVP+ is not limited to these systems, processes, formats, protocols and/or platforms. Moreover, the software architecture of the GVP+ (and/or) the Master Object Manager, preferably achieves update rates facilitating real-time viewing on at least one display and permits a user's area(s) of interest to be embedded at a preferably pre-selected resolution. Still further, the accurate and rapid visualization of an area via orienting position is preferably based on the WGS-84 geophysical standard for world shape to at least one eyepoint. The WGS-84 geophysical standard is fully compatible with standard navigation systems, and, preferably, included within the user's desired area of interest are relevant events (which may have a range of spatial and temporal gradients). Also, it is known that systems operating to the WGS-84 standard permit navigation systems to connect, register, and synchronize within the process. As a result, the accuracy of the data received by the system is virtually, if not fully, preserved.

Similar to the GVP, advantages of the GVP+, as compared to prior art, conventional systems, may include:

Accurate and rapid visualization of a wide area;

Visual capture of activity involving extensive spatial and temporal gradients;

Merging of actual imagery, geometric relationships and stored map data, with location and activity information;

Generation and control of the display including, but not limited to, large-scale visualizations;

Integration of data using full external "network" connectivity;

Production of displays meeting a user's dynamic and perceptual requirements;

Virtually, if not, immediate use of acquired data;

Capable of being adapted for use by a single person or a large group;

Standard two-dimensional and/or simulated three-dimensional outputs, or fully stereoscopic depictions;

Supports use for both simulations and actual operations in real time;

Simplified design of alternate configurations;

Improved robustness;

Increased flexibility; and

Readily upgradeable.

As with the GVP, and preferably, the embodiments of the present invention GVP+ can be (or should be capable of being) applied to depict any activity requiring a decision maker to undertake one or more of the following actions: plan, coordinate, control, communicate, command, assess, reconnoiter, negotiate, direct, collate, organize, and/or terminate activities, and/or undertake any action related to any of the above, either before or after in time. Sample activities include, but are not limited to, military flight test operations, training, simulations, tests, computer modeling, war games, maneuvers, combat operations, flight guidance or vehicle guidance and/or the command and/or control of (or over) domestic disturbances. Importantly, the realistic training available with the system saves capital equipment, as well as training and maintenance costs, while providing a better-trained individual. It is also capable of providing top-level decision makers with very realistic "hands-on" experience(s) without the expense of participating in an event that could incur significant costs, lives, and/or materials.

Preferred embodiments are fully disclosed below, albeit without placing limitations thereon, and other features and their advantages will be apparent to those skilled in the art from a careful reading of the Detailed Description of the Invention, accompanied by the drawings.

DETAILED DESCRIPTION OF THE INVENTION

GVP

Figure 1:
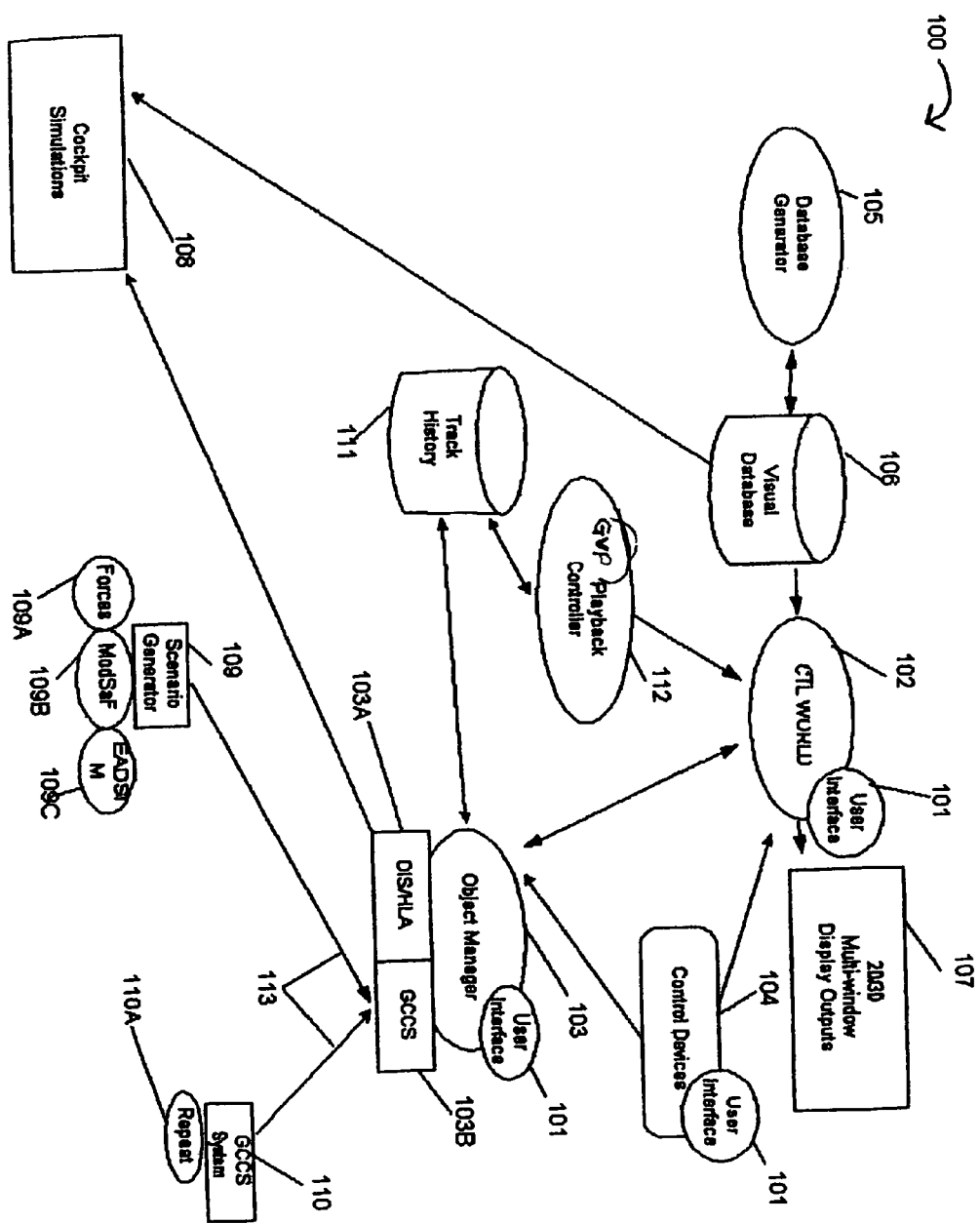
FIG. 1 is a flow chart depicting functions performed in an embodiment of the present invention.
Figure 2:
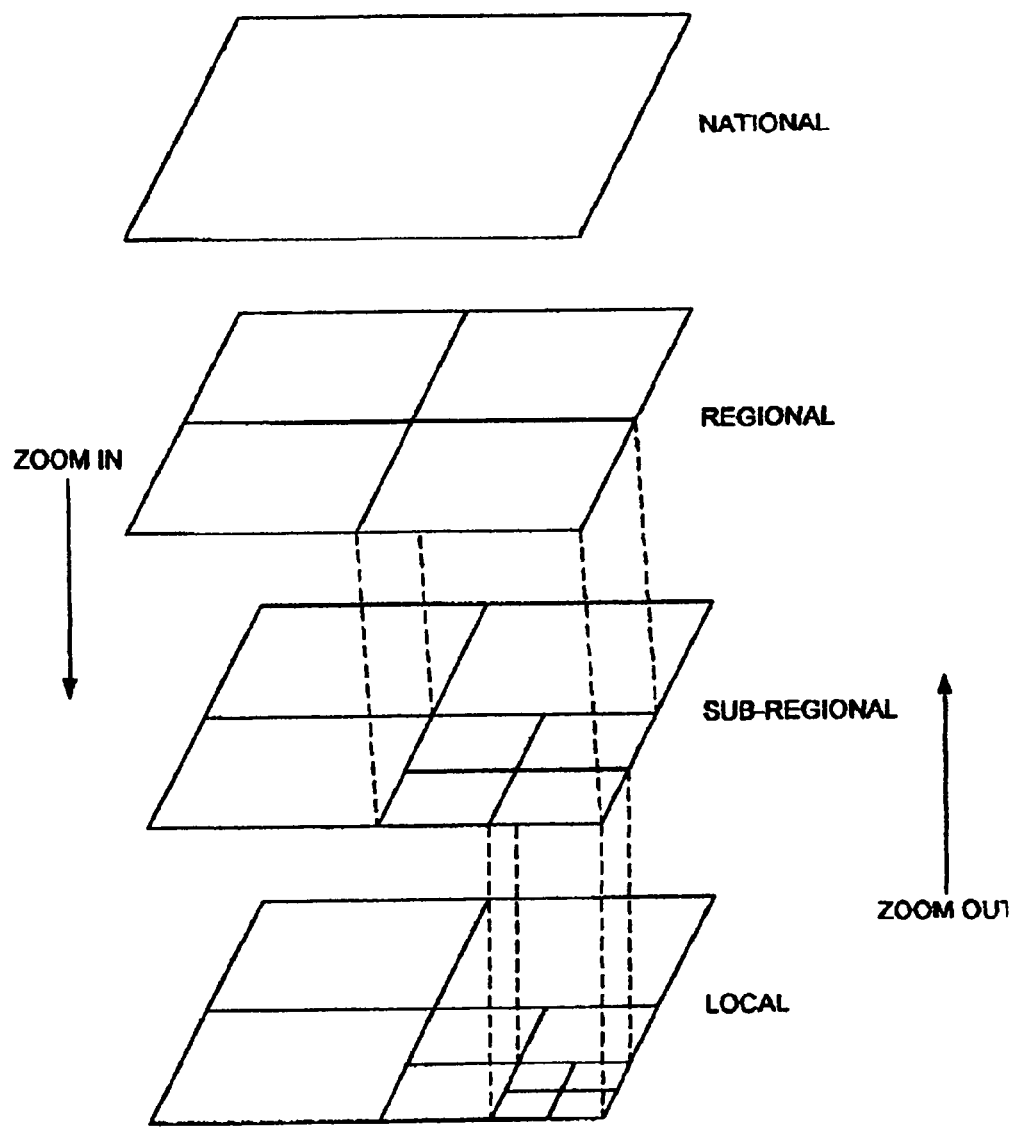
FIG. 2 is a diagrammatic perspective view showing a "tree" data structure relationship between grid quadrangles at different grid levels—for shifting or scrolling between grid quadrangles at the same grid level and for "zoom in" and "zoom out" between grid quadrangles at different levels.

As background, and while referring to FIGS. 1 and 2, an example of an embodiment of the underlying GVP invention, which is used, at least in part, in the present invention GVP+ is shown. A preferred embodiment of the GVP (the system 100, as shown in FIG. 1), incorporates hardware and software as elements to be combined with procedures and processes to obtain, format, store, combine, control, display, record, visualize and interact with accurate, realistic terrain models and events or activities in, on, above and below the terrain. Elements of the developmental system include several commercial computer and display products of advanced but conventional design. The GVP software runs on standard computers, including both graphics processing computers and personal computers. Some of the software employs commercially available programs and interfaces with commercially available programs.

Again referring to FIG. 1, User Interfaces 101 permit software manipulation of databases, storage, interface to internal sources and an external interface module (Master Object Manager 103), replay, and a display through CTL World software 102, interface to sources external to the process and internal functions via a software module, Master Object Manager 103, and user input and control through a variety of electromechanical control devices 104, such as a keyboard, mouse, or joystick.

A database generation process 105, functions (off-line) to make visual database file structures which populate a visual database 106, that may be manipulated by CTL World software 102, to provide displays 107 in multiple windows in either two or three dimensions and which may also be input directly to displays in cockpit simulations 108. The Master Object Manager 103 provides interface to external sources, either simulations using DIS or a HLA or actual scenarios using GCCS 103B, for example. Simulation scenarios may be provided by a scenario generator 109, that may include inputs from conventional modeling and simulation programs such as FORCES 109A (Force Operational Readiness Combat Effectiveness Simulation), ModSaF 109B (Modern Semi-automated Forces), or EADSIM 109C (Extended Air Defense Simulation), or actual or simulated events using a GCCS system 110, including its Repeat (data record and replay) mode 110A. A history of object positioning, eyepoint and events is maintained as a Track History 111, in turn provided to a replay system, GVP Playback Controller 112, for manipulation by CTL World software 102 in developing depictions for display on a multi-window display 107 or for use by the Master Object Manager 103 including for use as input to cockpit simulations 108.

GVP incorporates specialized processes to develop terrain models, termed database generation 105. Standard commercial database generation support software including TER-REX™, ERDAS IMAGINE®, MULTIGEN®, and SGI® elements are employed in specialized or customized ways along with customized or original CTL software and procedures to turn terrain imagery and elevation data files into GVP terrain model database products, i.e., a visual database 106.

The specialized file and world geometry of GVP requires specific and unconventional operations to organize standard source data 113 in terrain imagery and elevation data to create terrain databases 106. Major parts of the database development processes run on small single processor or multiprocessor PCs, and can apply to data from all conventional sources, including multilayer map material. For example, satellite and aerial imagery from numerous sources, in different wavebands and formats, have been processed successfully. Visual databases 106 for GVP are populated by generating imagery files, called clip texture files and storing these separately from terrain geometry files. Terrain geometry, as processed for database use, generates triangulated irregular network (TIN) files. These are polygons assembled to approximate the surface shape of the terrain. Coordinating the image files, the geometry files, relative information content and sequencing for precision and speed in both the file generation processes and in the image generation process is a key strong point of the GVP invention. Both types of files have an associated resolution (provided as data density) indicating the degree of precision in representing the actual source terrain. An advantage of GVP is that clip texture files and terrain geometry files are retained and processed separately, not being combined until late in the "display generation" process, thus saving interim computation steps. [ASIDE: Preferably, the GVP+ does not use clip texture files, and the files used are not retained and/or processed separately. In other words, the files used in the GVP+ are preferably combined, and may be kept this way, until they are needed (later) in the "display generation" process.]

As illustrated in FIG. 2, GVP applies dual "quad tree" architecture for the clip texture and terrain geometry files. In actuality, the terrain imagery files comply with the SGI® display software, PERFORMER™, which employs clip textures in a hierarchical format of SGI® design. However, other display control programs capable of generating video views of 3-D modeled objects could be incorporated. For the purposes of this application, it is a quad tree, forming one half of the dual quad tree architecture. In a preferred embodiment of the present invention, a base terrain skin is generated according to an approach referred to as the "quad tree" approach. Under the quad-tree approach, a region of terrain represented by a tile at a coarser level of detail may be represented at the finer and next level of detail by four tiles. Furthermore, the scene graph is generated such that when the terrain skin is played back, a tile is never displayed at a level of detail that is more than one level different from the level of detail of any adjacent tile. Finally, the polygons in each tile are generated so that the shared edges between the tiles appear well matched. Techniques for generating a terrain grid according to the quad-tree approach and for generating grids formed of matched shared edges are well known to those skilled in the art. Using a dual quad tree approach, that is one for terrain shape and one for imagery, enables management of both position and resolution variations for development of "worldwide databases". GVP achieves its high performance in area, resolution, precision and speed by effective innovations, architecture, and balanced design in the dual quad tree approach. At the lowest resolution (data density) and detail, an entire hemisphere can be depicted in one working file level. The resolution of the display 107 can be matched or exceeded for distant eyepoints (not separately shown), e.g., a view that includes an entire hemisphere, by a visualization database 106 with relatively low resolution, i.e., on the order of 1 or 2 kilometers smallest detail element. This "zoom out" version comprises the first quad tree level for the GVP architecture for both clip texture and TIN files. Each level is further divided into four sub-sectors depicting one-quarter of the area, but with similar file size and amount of detail data or polygons thus making much higher resolution as first "zoom in" version. This structure is repeated as necessary to provide the resolution required by a user, i.e., additional "zoom in" and "zoom out" versions, as illustrated in FIG. 2. Imagery is also processed in stages with increasing resolution and conforming to the TIN Quad Tree file structure. This forms the basic information storage and data manipulation architecture of the GVP system.

A preferred embodiment of the GVP incorporates an architecture with 32 levels that can hold and operate anywhere on the earth's surface with a maximum resolution of about two centimeters. Further, the architecture is expandable, as necessary for higher resolutions or other purposes, such as celestial bodies, operations in space, or even for mapping man-made objects.

Advantages of the GVP include:

The processes of database implementation tailor multi-source data and generate quad tree structured terrain models with corresponding image data files.

Storage is implemented in a conventional computer hard disk array;

Display software, termed "CTL World," accesses the quad tree files to page in data at the resolution required to match eyepoint and display considerations, to order the computation of video display images and to do everything required to generate completed viewable models.

It includes stereoscopic display considerations.

The CTL World display generation process uniquely combines several advances in visualization software, such as:

Model and computational architecture retains separation of the texture (or imagery) and geometry files until late in the display run time, thus truncating much of the preliminary computation prior to window content selection—this, in turn, permits current computers to produce fast update rates, above 30 frames per second, suitable for demanding flight simulation and other applications.

Improved world reference geometry bases the position orienting processes on the WGS-84 Geophysical Standard for world shape, in turn being fully compatible with modern navigation systems.

Models built using GVP retain positional accuracy in the original data, in turn, enabling accurate depiction of platform locations and reported events. Models built using GVP retain positional accuracy in the original data, in turn, permitting effective verification and validation operations.

Terrain and imagery file structure permits multiple resolutions or detail levels so that areas of interest can have highly detailed coverage while other areas do not. Selected areas can be revised or updated independently. Coverage areas and detail levels can be populated to fit the available storage facilities (disk array resource allocation), and not be constrained by other computer system limitations.

CTL World software incorporates flexible user interface provisions, various input device drivers for position and motion control, and broadly functional application programmer interface (API) features enabling quick tailoring to new uses.

Input devices 104 include, for example, multiple controls for video signal outputs for display device type and location matching adjustments, control over the stereoscopic rendering parameters, and input selection options for motion-position control devices such as two-axis joystick controls and three-axis (six degree of freedom) helmet motion trackers.

Completing the basic GVP architecture is a separate software module termed the Master Object Manager 103. The Master Object Manager 103 interfaces the system to outside events of all types and determines the objects and activities displayed with the terrain model. It permits two-way communication with simulation 108, modeling 109 and operational events 110 external to GVP. Network operations currently implemented via Master Object Manager 103 interact with standards-based processes for distributed interactive simulation (DIS), and with the DoD systems operating with High Level Architecture (HLA) 103A. For interaction with operational forces 110 the interface employs Defense Information Infrastructure Common Operating Environment (DII-COE) formats (not separately shown) for the Global Command and Control System (GCCS) 103B. In these formats, and generally compatible with computer network communication protocols, the Master Object Manager 103 assembles and tracks locations, orientation, types, activities, and depiction-relevant factors for fixed and mobile objects of all types. Within the Master Object Manager 103, various sorting, filtering and aggregation algorithms refine an "object list" (not separately shown) for the display system 107. Some aspects of selection for visibility and display level of detail (LOD) required are conducted inside Master Object Manager 103 to reduce computational demands in the CTL World display generator 102. This reserves computer resources for the graphics processes CTL World display generator 102 and orders the data traffic between the CTL World display generator 102 and processes or systems outside GVP including simulations 108, scenario generators 109, and operational events 110. In addition, Master Object Manager 103 can command or "feed" multiple copies of CTL World 102 to match a variety of extended visualization generation demands and to synchronize multiple remote or nearby visualization processes to a common consolidated data set.

Finally, the GVP architecture is completed by two supplementary elements, a track file recorder 111 to store motion paths as track history of various events for data purposes, and an all purpose event replay control utility, shown as GVP Playback Controller 112. Processes external to GVP, but to which it is designed to be connected, e.g., simulators 108, models 109, and operational data or operational data recorders 110, normally have their own data recording and replay capability. These two elements of GVP function to replace those separate operations, combining sources for the display 107 and for activities initiated internal to GVP. For example, the local computer interface to GCCS 110 inputs is itself a computer and has record-playback capability (i.e., "Repeat" 110A). The Repeat capability might suffice, to reconstitute and replay or manipulate visualizations accomplished with the GVP system alone, but if the visualization involves other data sources as well as GCCS 110 events, this would not be practical. Thus, GVP uses its track history 111 and GVP Replay Controller 112 to reconstruct and manipulate visualizations.

In sum, in an embodiment for use by government users, GVP incorporates a suite of government owned products and software processes that are suitable for use in a variety of applications, e.g., military scenario depiction and visualization. The specialized architecture of GVP allows creation of operating models that are geo-specific, geo-referenced and universally scalable. The results are accurate depictions of a round world. The GVP products support immediate direct application in a variety of possible roles, all emphasizing enhanced situational awareness, precision, and accuracy in the use of positional information, as well as support for a higher tempo of operations with increased confidence and reduced risk. Further, imagery-based terrain models, with terrain elevation data, can be generated from all data sources 108, 109, and 110 in selectable degrees of resolution. Combined for display products can include terrain models, fixed and mobile object models, weather or visibility effects, and map materials with multiple "layers" of information.

GVP operating models are geo-specific, geo-referenced and universally scalable. In a preferred embodiment of the present invention, a geographical coordinate system enables accurate and rapid visualization of an area via orienting position based on a geographical coordinate system to at least one eyepoint. The geographical coordinate system is fully compatible with standard navigation systems and permits navigation systems to connect, register, and synchronize with the system. In a more preferred embodiment of the present invention, an internationally valid coordinate system is incorporated as the geographical coordinate system. An applicable geographical coordinate system is the round-world WGS-84 standard that permits inputs from all modern navigation systems to connect, register, and synchronize correctly. The WGS-84 is an approximation of the earth's surface defining a coordinate system, which provides a reference surface for GVP, and the geoid is the difference between the WGS-84 model and the true surface of the earth. Terrain model resolution is dependent primarily on source imagery characteristics, but there are important considerations with respect to demands for memory, i.e., dynamic computer texture memory, dynamic graphics memory, and application-specific demands for display update rate. GVP software architecture has been optimized to achieve very high update rates. The GVP software can achieve update rate of between 50 and 60 frames per second including in stereoscopic mode. Additionally, specific "high interest" areas, as identified by a user, may be embedded in GVP models at a required high resolution.

The GVP software handles large complex models while maintaining a high update speed, i.e. above 50 frames per second. A typical set of cultural features, such as buildings, can be added to GVP terrain models without adverse impact on frame rate. Large numbers and many types of mobile objects can be added with appearance, location, and dynamics established by external sources 108, 109 and 110. The GVP architecture and model-handling processes enable relatively large numbers of such scenarios to be modeled or displayed while maintaining high update rates.

Terrain and any depicted features or modeled objects display at appropriate and controllable resolution levels or level of detail based on primary object resolution, eyepoint distance and display 107 surface capability. The eyepoint(s) for viewing are entirely controllable along with all other relevant display 107 parameters.

Communication to the system is established and functional in several modes. Military elements and operational entities can be connected via DII-COE messages in GCCS-M or other variants of the Combat Command and Control System standards. All types of simulation can be connected via HLA standards-compliant means and by DIS-formatted data 103A. Other standard means such as the military LINK and air traffic control radar data (not separately shown) are also accommodated.

By using a separate but integrated Master Object Manager module 103 for collecting communication and control processes, the architecture:
  streamlines CPU (not separately shown) resource allocation;
  manages communication bandwidth;

structures upgrade efforts in the sense of tailoring the system for selected uses;

employs consistent application programmer interface (API) elements (not separately shown); and assures reusability and scalability in GVP application task software 102.

The GVP CTL World display software 102 architecture is written for, and adapts itself to, multi-processor CPUs, multi-channel video outputs (not separately shown), and multi-pipe computer systems (not separately shown), using all system resources.

The GVP CTL World software 102 that controls video output and creates the visualization is government owned software and includes interfaces to all software drivers (not separately shown) for input and output devices. Complete process and programming control affords freedom to optimize the system for specific applications and to capitalize on any available innovations. Interactive devices including mouse controls, joysticks, helmet-mounted head and eye trackers, voice control, gesture recognition, etc. can be used without limitations imposed by inaccessible software source code.

All depictions in the basic GVP displays can be formatted as video products to be operated and displayed as perspective 2-D views of 3-D models 107, scalable to various ranges and viewpoints. The GVP CTL World software 102 also supports binocular stereopsis for true 3-D displays in several modes. CTL World 102 outputs active stereo, viewable with shutter glasses for left and right eye view control. Dual optics virtual displays without shutters, i.e. virtual display devices, are directly supported including those for head directed, helmet mounted or head mounted displays. CTL World software 102 also supports custom 3-D visualization products such as FAKESPACE VERSABENCH™ and other passive stereo displays which are generally viewed with polarized lenses for left and right view control.

For all viewing modes and devices, CTL World software 102 has the necessary control over video output to provide corrections and adjustments to match or trim for display device and viewing geometry requirements. Explicit control of all stereo viewing parameters is incorporated in CTL World software 102 for full control of the stereoscopic viewing experience. Dynamic response to scaling changes in eyepoint is provided to maintain the intended stereoscopic effects.

In one embodiment, GVP supports investigation of human engineering issues in advanced technology displays and information visualization. It provides effective and efficient software having an architecture tailored to interactive military systems. In another role, GVP can help speed development, while reducing costs of new systems, by covering in simulation and testing various aspects of DoD missions.

Additionally, GVP may be implemented to reduce required memory to hold large area database files by incorporating fast file compression and decompression. Further, GVP may be implemented to accept "streaming" information, i.e., "continuous" real time imagery or other data from sensors, to update or replace database material, thus, providing timely updates for "real time" visualization.

EXAMPLES

Models suitable for flight simulator operation as out-the-window displays. Because GVP is fully compliant with "round-world" geometry standards, interfaces are facilitated in interactions between simulation models such as DIS that incorporate operational position data in the simulation. The GVP model type and construction and the GVP CTL World display software comprise a standard or uniform product type suitable for "high end" military flight training simulators.

Unmanned Airborne Vehicle (UAV) and UCAV systems. GVP is suitable for training, multi-platform command and control, reconnaissance and surveillance processes, planning and rehearsal, and rapid prototyping applications.

Interactive visualization during tactical flight operations. Applications range from mission rehearsal including while deployed or airborne to operational exploitation of near real time tactical intelligence. GVP-based displays, by providing a full visualization context for mission depiction, may also provide a natural means for ground and aircrew to interact with and control advanced interactive aircraft design features for pilot aiding devices and system automation features.

The above descriptions should not be construed as limiting the scope of the invention but as mere illustrations of embodiments. For example, although examples discussed at length focus on military applications, the method and apparatus is applicable to any that a user may need to visualize in real time "relatively wide" areas within which dynamic "relatively large" scale events occur. Therefore, the scope shall be determined by appended claims as interpreted in light of the above specification.

GVP for Personal Computer Platforms (GVP+)

To practice an embodiment of the present invention as described herein, at least portions of the source code for an embodiment of the present invention have been submitted on a "computer program listing appendix" compact disc, and the information and/or data contained therein is incorporated by reference in its entirety. Moreover, while the discussion herein illustrates preferred embodiments of the present invention, it does not limit the present invention from being implemented (and/or configured) in a myriad of other manners within the spirit and scope of this Application. Moreover, while the devices, a portion of the software and/or processes, circuits, and/or other components used in the present invention preferably come from the group of devices, software, processes, circuits, and/or other components that are well-known, and/or are commonly (or readily made) available, other means of implementing the present invention may also be used as well. As background, it should be noted that the preferable use of network-ready functionality that enables the coordinated operation of multiple GVP+ processes and/or systems with a single (preferably) dynamically organized database of events and/or objects is now incorporated in the primary GVP+ (and/or GVP) software as an integral part of the invention. Previously, this capability was a separate process (see, e.g., the above-described Master Object Manager discussion) needing additional computer equipment to be accessible to the main image control and generation process. Because of this addition, the invention can now operate in commodity class PC computers and, depending on speed and/or coverage demands, can also be installed in more limited-performance computers including, but not limited to, laptops and tablet devices, and may be, possibly, installed for operation in miniaturized computing devices as well. Moreover, as a non-limiting definition and where appropriate, the term "model" as used herein may refer to at least some of the following: at least one terrain model including, but not limited to, those that may be comprised of texture or shape or both; shape and/or appearance records or renderings of a real object including, but not limited to, one or more buildings, one or more vehicles, and/or one or more other real objects; and constructive processes, which may be used to record or predict the actions of selected entities in interaction over time including, but not limited to, the simulation of aircraft actions, the interactive events of action elements as in a war game, a theory-based mathematical description of processes and events, and/or other systematic time-referenced descriptions of complex events and/or processes.

Figure 3A:
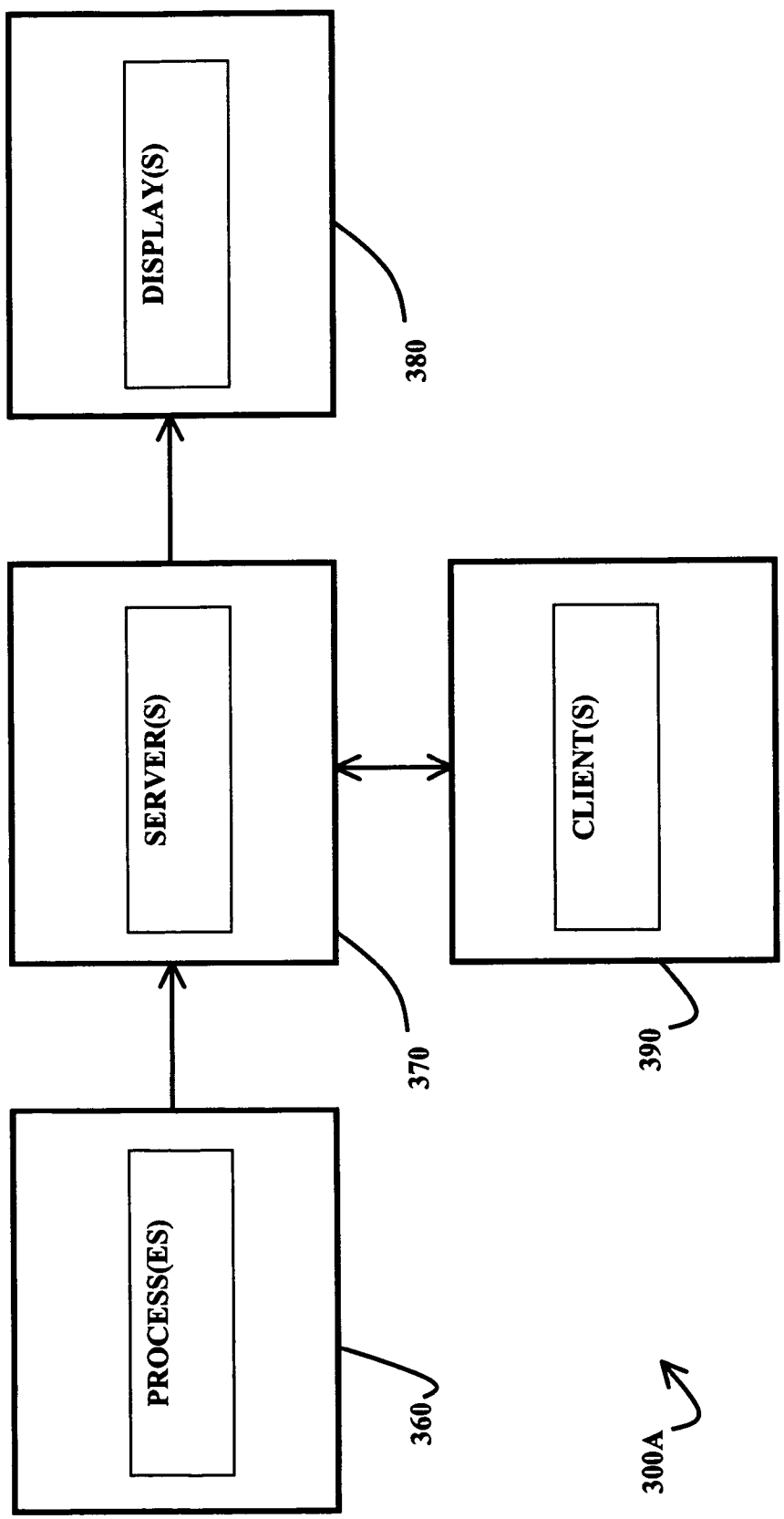
FIG. 3A is a block diagram of the GVP+, according to an embodiment of the present invention.
Figure 3B:
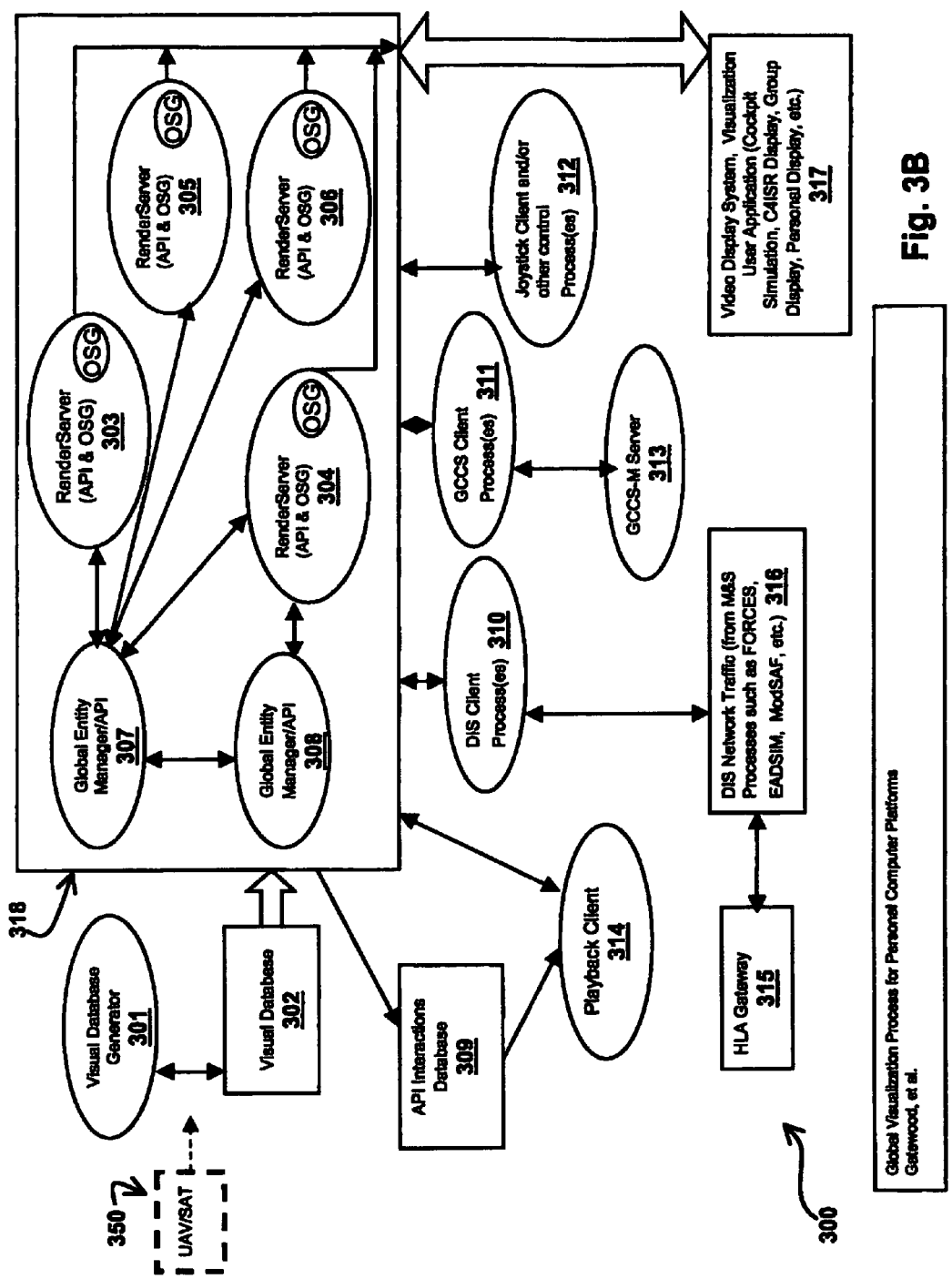
FIG. 3B depicts the process functional block diagram and illustrates the unique software architecture of the current invention.

Referring now to FIGS. 3A and 3B, a general block diagram of the GVP for Personal Computer Platforms (300A) is shown in FIG. 3A, and the elements that may be associated with these blocks as well as an embodiment of the present invention GVP for Personal Computer Platforms (GVP+ or the System, 300) are shown in FIG. 3B. Preferably, and as shown, the System 300 incorporates hardware and software that is used with and/or combined with procedures and processes in order to (at least) accomplish the purposes and/or applications of the original GVP, but the GVP+ 300 does so in different ways with novel and unique features and desirable new capabilities for effective application to a new class of user's needs. Preferably, the System 300 is constructed to operate using the LINUX operating system in conventional computers, and with the associated hardware called desktop personal computers, laptop computers and/or other relatively small and relatively inexpensive data processing hardware; however, the GVP+ could be configured for use with other processing platforms and/or for other purposes and/or applications as well. Furthermore, C++ is the preferable high-level computer language used, but other languages could be used as well. The System's software architecture is preferably tailored to operate efficiently in the main processors and the video processor components of today's personal computers and in other small data processing hardware. Moreover, the GVP+ 300 does not require the use of non-U.S. Government proprietary software or limited-license or limited-availability software components for its implementation and/or operation. On the other hand, the GVP+ 300 invention does employ, or incorporate to some degree, software products that are conventional open-source materials developed by others. These elements may include some (if not all) of, but are not limited to, the following: The Adaptive Communication Environment (ACE); the ACE ORB (TAO), preferably implementing the common object request broker architecture (CORBA); the Open Scene Graph (OSG); the Developer's Image Library (DevIL); the GNU Scientific Library (GSL); the GNU Libtool; and the GNU Portability Library (PLIB), which is also referred to as Steve's Portable Game Library.

More specifically, but without limitation, the GVP+ 300 (and/or its processes) may comprise at least some of the following elements (as shown in FIG. 3B):

At least one "GVP for Personal Computer Platforms" (GVP+ or System) 300 [ASIDE: other GVP, GVP+, or other similar systems, applications and/or processes can be preferably linked];

At least one, preferably, separate visual database generation process, which is preferably off-line, as represented by the Visual Database Generator 301;

Stored computer memory files, which in FIG. 3B is represented as the Visual Database 302;

At least one computer server-client structured "server element," which is represented by box 318, and which includes RenderServers and Global Entity Managers, which are represented by: "RenderServer (with API & OSG)" 303; "RenderServer (with API & OSG)" 304; "RenderServer (with API & OSG)" 305; "RenderServer (with API & OSG)" 306; "Global Entity Manager with API" 307; and "Global Entity Manager with API" 308;

An API (Applications Programmer Interface) Interactions Database, 309, and an associated Playback Controller 314;

Client process elements to manage communications with external data sources including, but not limited to, at least one DIS Client Process 310, and/or at least one GCCS Client Process 311;

Client process elements to control user interactions and management of the GVP+ 300 including, but not limited to, the Joystick Client and/or Other Control Processes 312;

At least one Video Display device in (on or with) which the visualizations generated by the GVP+ 300 are displayed to the users (as represented by the "Video Display System, Visualization User Application (Cockpit Simulation, C4ISR Display, Group Display, Personal Display, etc." block 317)); and The GVP+ 300 may also include other internal and/or external functions, processes, and/or activities including, but not limited to, those that generate communication inputs that may be used by the Global Entity Manager(s) as data sources, such as, but not limited to, those represented by the blocks labeled "HLA Gateway" 315, and "DIS Network Traffic (from M&S (Modeling & Simulation) Processes such as FORCES, EADSIM, ModSAF, etc." 316).

While the above is a non-limiting example of preferable elements, it should be noted that other configurations and/or implementations are possible, including, but not limited to, a configuration and/or implementation having one or more other network connections, which could possibly be used to coordinate with (or control) other processes such as one or more remote Global Entity Managers (regardless if such connection is hardwired, wireless, LAN, WAN, satellite, or etc.—none of which are shown). Moreover, the GVP+ 300 may be preferably implemented to accept "streaming" information, e.g., "continuous" real time imagery or other data from sensors or etc., to update or replace database material, thus, being capable of at least providing timely updates for "real time" visualization—this is represented in FIG. 3B as the "UAV/SAT" 350 element, but it should be understood that such source(s) of information/data are not limited to communications or transmissions from Unmanned Aerial Vehicles or Satellites.

Preferably, the GVP+ 300 employs an off-line set of procedures and processes to produce a multiplicity of data files in a specially formatted hierarchical memory structure (as represented in FIG. 3B by the Visual Database Generator element 301), and to hold visualization models of global-sized terrain areas (as represented by the Visual Database 302). Specifically, the basic model information is preferably stored in "appearance files" called "texture files", and in "shape files" constructed as triangulated irregular mesh networks called "elevation files". Preferably, the GVP+ 300 employs client server design architecture, and the processes, which function as "Server Elements" in this architecture, are represented by the "Server Elements" box 318 in FIG. 3B (and the "SERVER(S)" block 370 as shown in FIG. 3A). They include, but are not limited to, one or more Render Server structures; the first 4 (of n) of these are represented by: "RenderServer (with API & OSG)" 303; "RenderServer (with API & OSG)" 304; "RenderServer (with API & OSG)" 305; and "RenderServer (with API & OSG)" 306. The system also employs one or more Global Entity Manager elements; the first two of these are represented by: "Global Entity Manager with API" 307; and "Global Entity Manager with API" 308.

Preferably, each of these elements shares several software architecture and code structures in common, and they preferably have a common Application Programmer's Interface (API), which is fully identical in program structure, which is based on common software content, and which interacts in a similar manner with other processes inside and outside the GVP+ 300.

Preferably, the Render Servers include and/or produce outcomes appropriate for Open Scene Graph (OSG) pictorial renderings of the final visualization models. More specifically, each one preferably connects to Open Scene Graph video generation software, and to a personal computer's video processor hardware to generate its associated video rendering for the output visualization. Preferably, the Render Servers and Entity Managers employ common entity structure and data structure forms—so that all entity classes are named and defined in a common terminology across the Render Servers and Entity Managers. As a generality, a single Render Server controls output to a single display channel (which, depending on the external display device and characteristics, may be complex in form), and, preferably, multi-channel display requirements are generally met with multiple Render Servers. As a non-limiting example, a straightforward, large-scale video display (or screen) for use by a group may include several video display projectors organized in a large screen array, and, preferably, one Render Server would generate the imagery for each such individual screen or display. On the other hand, under some conditions and as another non-limiting example, one Render Server could fill the display requirements of two adjacent displays depending on the display surface resolution and the hardware capabilities of the personal computer video processor and/or other hardware elements. Specifically, characteristics and features of the basic Render Server architecture preferably allow multiple Render Server units to be synchronized (e.g., at least in timing) in order to provide for the production of a smooth video display for composite multi-channel visualizations. Consequently, this retains (or allows for) fast update rates and eliminates or nearly eliminates visible disruptions and irregularities in scene update and movement. Moreover, because of the commonality of API structures and entity class construction, Render Servers and Entity Managers can preferably connect with one another and with external processes in multiple and flexible ways in order to meet a user's application needs. And, as a non-limiting example, FIG. 3B shows that four Render Servers and two Entity Managers are connected and operating. Furthermore, by using the GVP+ 300 process, the client and/or control elements, and/or other processes inside and/or outside the GVP+ 300 can preferably generate and connect to each appropriate Render Server and/or Entity Manager element in a uniform, orderly way, i.e., by preferably using a common language, common procedure(s), and common software structures.

Preferably, the GVP+ 300 also utilizes an API Interactions Database 309, to which all communications to (and from) the APIs of the render servers 303, 304, 305 and 306 and the entity managers 307 and 308 are reported for recording. Preferably, the detailed record accumulated in the API Interactions Database 309 can be employed by a Playback Controller, as represented by the "Playback Client" 314, to preferably regenerate the full system output of the GVP+ 300 at any time subsequent to an initial operation—for at least the purpose of providing for the full and complete reproduction of an original earlier operation.

Other preferable processes may include, but are not limited to, components specifically for control of the GVP+ 300, and also those for communication with outside processes. As a non-limiting example, a Distributed Interactive Simulation (DIS) interface, as represented by the "DIS Client Process" 310, is incorporated in the GVP+ 300 to enable direct connection with a major class of computerized simulations using the DIS Protocol and communication means. More specifically, but without limitation, Simulation and Modeling interactions with other systems employing the DIS or HLA technical approaches can connect to the DIS Client Process 310 (as shown in FIG. 3B) (by the possibly, external to GVP+ 300), HLA Gateway 315 and the DIS Network Traffic component (represented by the "DIS Network Traffic (from M&S (Modeling & Simulation) Processes such as FORCES, EADSIM, ModSAF) etc." block 316). Preferably, "operations" involving this interface pathway may include, but are not limited to, constructive model and simulation operations, and applications such as war-gaming scenario-generator-systems. Similarly, and preferably, a Global Command and Control System (GCCS) Client (as represented by the "GCCS Client Process" element 311) may be an element of the GVP+ 300. Preferably, its purpose is to effectively interface with external GCCS Maritime Servers in order to enable interactions with operational forces, in this non-limiting case it is primarily the U.S. Navy. Moreover, other control process needs of the GVP+ 300, e.g., for direct operator input, for display eyepoint control, and/or for other control functions, are preferably met by the Joystick Client (as represented by the "Joystick Client and/or other control Process(es)" element 312).

Preferably, when operated for an application, the GVP+ 300 is prepared in advance with global terrain information to permit it to generate visualizations—this information and/or data can be from all types of sources, it is preferably processed off-line, and it is used to at least generate the information for the Visual Database Generator 301 and/or the Visual Database 302. Furthermore, imagery can be from different sources; in various wavelength wavebands; and may include satellite and aerial photography. Moreover, the GVP+ 300 possibly allows for: the terrain elevation data to include different sources and types of input; the use of mixed levels of resolution; and the mapping information to be applied to the Visual Database Generator 301 and/or the Visual Database 302, and/or otherwise used to create the "visual database" and/or the "visualization database." And, because of the use of the unique data structure (i.e., employing a hierarchy that can be generally described as being a quad tree (or in other possible embodiments as a dual quad tree) structure (see FIG. 2) with a multiplicity of file structure layers), the "visual database" can contain information at many different levels of resolution, which can be selected according to the video display surface resolution for a given visualization condition, and selected individual portions of the "visualization database" can be independently updated or revised, or extended in detail without revising other areas.

Visualizations setups can be applied to the GVP+ 300 establishing each Render Server and/or Entity Manager needed to match the user's display, communication and/or information requirements. Moreover, since the external entities (to be depicted) have associated reporting means and protocols, one or more of the Global Entity Managers are preferably set to track this incoming data and to maintain a global-in-scope, updated listing of all such events, and the Render Servers are set to produce a video output as needed by the application's display conditions and/or the user's information requirements. Operationally, the user's viewing eyepoint is indicated to the system to initiate display generation, and, as the eyepoint is controlled, the GVP+ 300 responds with the commanded repositioning of the eyepoint preferably causing the appropriate adjustment of the display. This is preferably mediated by a client process such as a joystick, a simulator's motion computation, or some other selected control input operating through the controller client interface (as represented by the "Joystick Client and/or other control Process(es)" element 312). For facilitation of this process, the Global Entity Manager(s) 307 and/or 308 retain information on all classes of events and entities of visualization interest, and, depending on rendering instructions of the user, including aggregation and de-aggregation instructions, the Entity Manager(s) 307 and/or 308 note when any traffic item of interest is in the eyepoint's viewing frustrum and cause it to be included in the video generation cycle so that it shows appropriately in the visualization. And, preferably, but without limitation, alphanumerics, symbols, icons, and/or 2D or 3D models, which may all be possibly taken from stored libraries of such objects, may be used to depict entities, (these libraries are not shown in FIG. 3A or 3B).

Because of the commonality of the software and its architecture, the Render Server(s) and the Entity Manager(s) can connect with one another and with client, control, and other process elements, as needed, in flexible and convenient ways. A non-limiting example is the generation of a historical interaction file in the Application Programmer's Interface Interaction File, as represented by the "API Interactions Database" block 309. In other words, all process interactions with all of the APIs in the Render Server(s) 303, 304, 305 and/or 306 and the Entity Manager(s) 307 and/or 308 are reported for recording in the API Interactions Database 309, preferably as a continuous process while the GVP+ 300 is running. This allows the Playback Client 314 to use these records to reconstruct a rerun of some previous operation at a later time, and the rerun can be used for analysis, instruction or for whatever other purpose that may suit a user's needs.

In a non-limiting example of a typical application, an operational user may employ the GVP+ 300 as a mission rehearsal tool. In this regard, the military area of operation (or other area of interest) may have recent tactical, or other terrain data, which can be loaded at the appropriate places in the visual database—to make the most recently available data part of the visualization. Furthermore, mission-planning information can be generated in a client process and connected to the visualization via the DIS and/or other protocol inputs (310, 311 and/or 312), and presented to at least one Entity Manager 307 and/or 308 for at least tracking. Moreover, the eyepoint control and timing—representing mission routing or other planned actions—can be input via one or more of the control clients (312). With this established, the view from the resulting eyepoint (and its path in time and space) can be reviewed, inspected, evaluated and/or studied as an element of mission planning and rehearsal activity, and, at some later time, the final selected action visualization can be run and/or rerun for practice or analysis.

Functionally, as the eyepoint view is generated and/or determined for any specific moment in time and/or space, the terrain and texture files are accessed by one or more of the Render Server 303, 304, 305 and/or 306 to extract the region of files containing the view defined by the viewing frustum. Then, as required by the user setup, the very basic WGS-84 model seen at that location is re-rendered with the combined local terrain depiction files (preferably including the appropriate lighting, weather and/or other available depictions). Terrain visualizations are then generated at resolutions that match (or challenge) the video display surface in use (e.g., personal displays, group displays, helmet displays, aviation cockpit displays, and/or other local or remote equipment), and all can preferably be accommodated as required. Furthermore, as the view is defined for the visualization, the at least one Entity Manager 307 and/or 308 inserts relevant entity and event information into the video generation process (via 303, 304, 305 and/or 306) so that the final depiction is as "true" as intended, and preferably holds the most recent information on events and entities in the area of interest. Furthermore, the process for file construction and file structure developed for and used by the GVP+ 300 includes precise geo-referencing of all data. And, preferably, the position data, for all terrain elevation and texture file materials, is specific for all displayed information (i.e., every pixel at every level is preferably referenced to a geographic location with exactness). Still further, to increase the efficaciousness of the GVP+ 300, technical means, preferably based on WGS-84 shape referencing for terrain, are employed in the GVP+ 300 to retain the precision of the initial geo-referenced input data, and to prevent any introduction of positional error based on the processes of the GVP+ 300, itself. Still further, and preferably, the visualizations generated by GVP+ 300 can be interrogated for geo-specific location data at any point in the display volume through the use of suitable, user application processes; thereby, producing directly usable location information.

As previously noted, the above may be a typical application, but it is not limiting. Many other actions and applications can be accommodated by the GVP+ 300. As other non-limiting examples, constructive simulations involving military or civil events can be depicted, preferably, by at least using the communication process interfaces. Moreover, use of the GVP+ 300 with local or remote manned simulations, or in concert with constructive simulations, can be supported, and, as a non-limiting example, military plans or scenario generators, or war games as well as other constructive simulations may be connected for depiction via the DIS, HLA 310 and/or other network interface clients (311 and/or 312) through one or more of the global Entity Managers 307 and/or 308. One property of the "Global Entity Manager" architecture is that it permits a single "entity manager" to consolidate complex data from multiple sources and to synchronize that data with the information held by other inside or outside processes. Importantly, by using networked operations and easily arranged API interactions, at least one Entity Manager 307 and/or 308 can, preferably, coordinate information and keep numerous visualizations generated by one or more other GVP+ 300 (any of which may be in different locations) all in order and up-to-date through the use of a common database. [ASIDE: Preferably, broadband video is normally generated near to where it is being used for display.] Moreover and preferably, manned simulations with individual platforms in operation can conduct activities within a visualization generated by a GVP+300, can report actions and movements via the DIS 310 and/or other protocol pathways 311 and/or 312, can receive information on other manned platforms (possibly acting in concert with visualizations that are being generated by other GVP+ 300s (and/or other systems, applications, and/or processes)), and both (or all) such activities can be configured to report and/or respond to scenario events generated in (or by) constructive simulations such as ModSAF (or by other models and/or simulations for complex events). With this in mind, it is easy to envision that very complex structures can be generated using the interface convenience, power, and flexibility of the GVP+ 300. Moreover, the architecture of the GVP+ 300 may enable several now-planned functional extensions. These include the capacity to receive streaming data input from real-time sources on terrain elevation and appearance and to promptly incorporate this material into visualizations with only minor processing delays (i.e., delays on the order of seconds or less, so that the effect is a near-real-time visualization data update). This capability could address tactical sensor information—such as appearance information for areas of high military interest—and this capability could include adapted registration of geographical precision, and geo-referencing in the source material, to meet a user's needs—generally within the known or refined accuracy of the input data. Preferably, the GVP+ 300 could potentially operate without destroying original visualization file structure data on the region of coverage, and possibly interact on a separate activity basis with GVP and/or GVP+ visualization database construction processes so that inputs may eventually become part of the permanent database-preferably, if that matches the application requirement(s) of the user. Also contemplated and possibly enabled by the present GVP+ 300 architecture, is fast-time database generation through the incorporation of some or all of the necessary data processing functions for visual database generation at or with the sensor system that collects the initial data. Whereas the current processing of terrain elevation and appearance data for populating the visual database is off-line, occupies relatively small and potentially slow processing capability, is relatively time-intensive, and involves substantial human attention, the actual procedures and processing could be more highly streamlined and possibly relocated near to or at the data source(s). This realignment of process operations within the scope of the current invention could render the GVP+ 300 capable of producing visualizations employing data of high and immediate currency with respect to visualized area appearance, and have an impact that may be the strongest for applications responding to or having major wide-scale regional changes.

Referring now to FIGS. 3B, 4A, 4B and 4C. Preferably, the GVP+ 300 employs a specialized hierarchical data structure to retain the terrain shape and appearance information for use in generating its visualizations. And, regarding this, one of the several new characteristics of the GVP+ 300 concerns the use of a data structure that does not contain clip textures (i.e., clip textures are a specific type of imagery files matched to the operating system and file structure previously employed by an earlier GVP embodiment). Another important difference is that the GVP+ 300 employs effective data compression in order to effectively reduce stored data file size in the Visual Database 302 (as shown in FIG. 3B) by about 8:1 (when compared to the initial file size). In other words, the stored compressed data resulting from the visual database generation processes (as represented by the "Visual Database Generator" element 301, in FIG. 3B) is approximately one eighth the expected size of the actual data file. Preferably, file size compression is provided by incorporating S3TC compression for imagery (a well known standard for image compression that is widely employed in video card products for Personal Computers), or by using some other appropriate compression method, process, and/or device, and then the files are preferably decompressed by utilizing hardware (and/or software) based decompression of the imagery information upon the event of video signal generation. Whereby, said S3TC compression and decompression reduce memory requirements, which may efficiently allow the user to develop database files representing large geographic areas. Moreover, to accomplish this, the mode of compression employed preferably matches the hardware data processing of the hardware video processor components being used. Importantly, all operations within the GVP+ 300 are preferably conducted upon the compressed files without expansion so that the benefits of compression are realized at every stage of processing, and, preferably, only when delivered to the final view generation hardware, e.g., as a non-limiting example, a computer component video processor card, are the compressed files reconstituted to uncompressed structures for display.

Figure 4A:
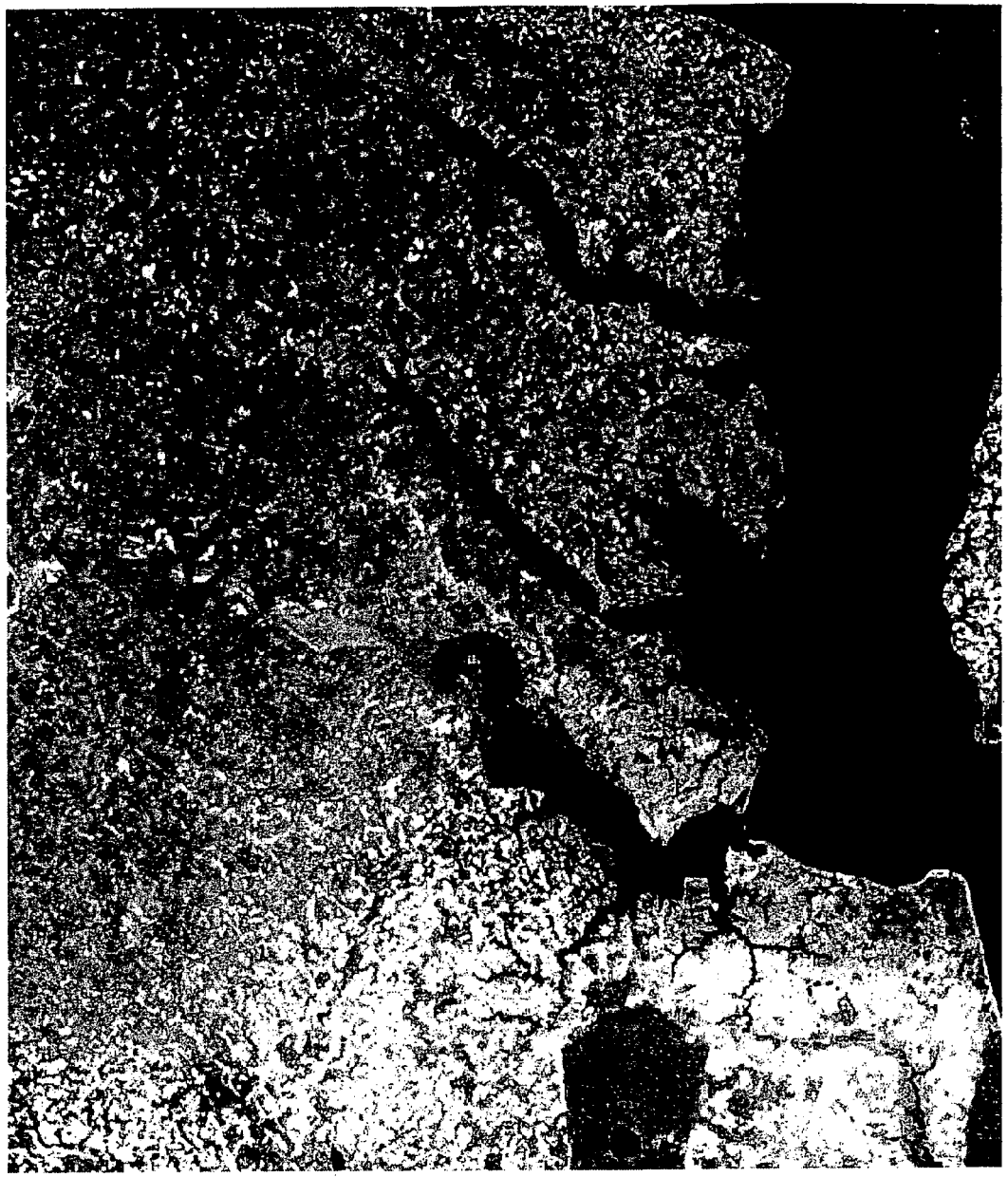
FIG. 4A depicts an Imagery (texture) file model, according to an embodiment of the present invention.
Figure 4B:
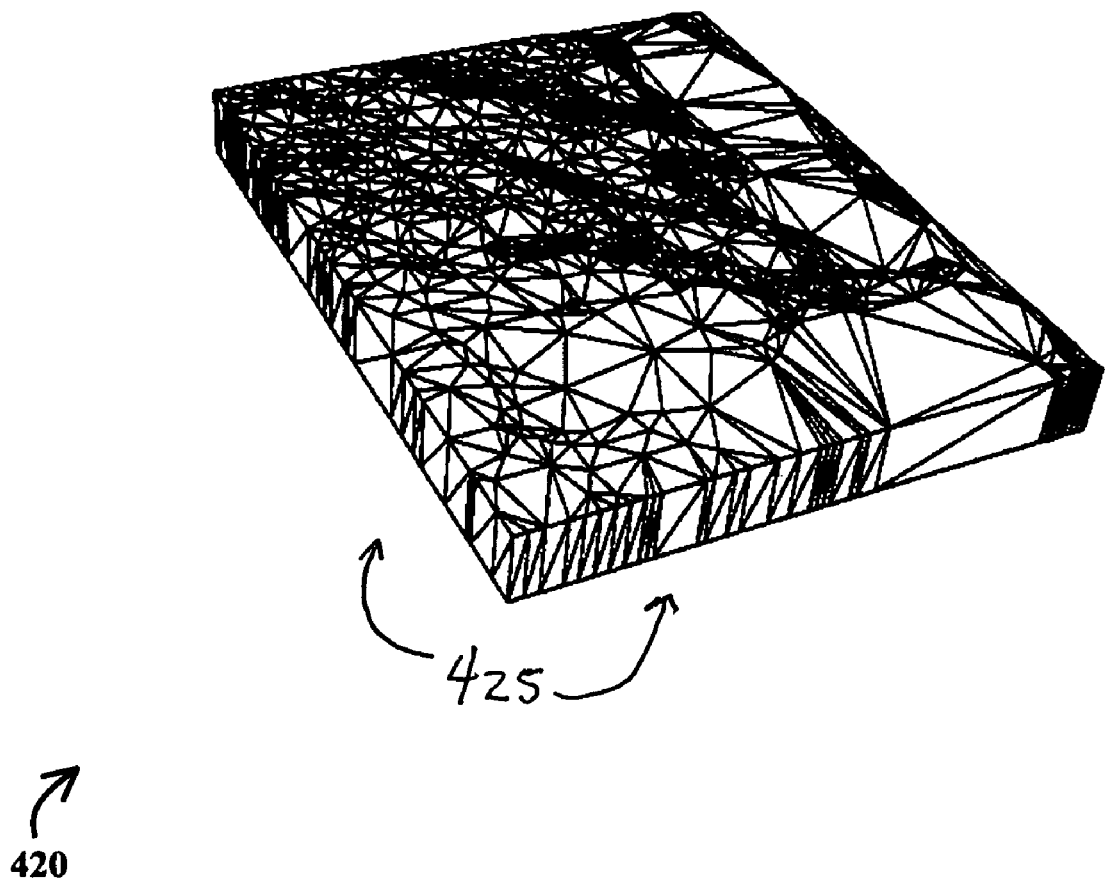
FIG. 4B depicts a Wireform (shape) file, according to an embodiment of the present invention.
Figure 4C:
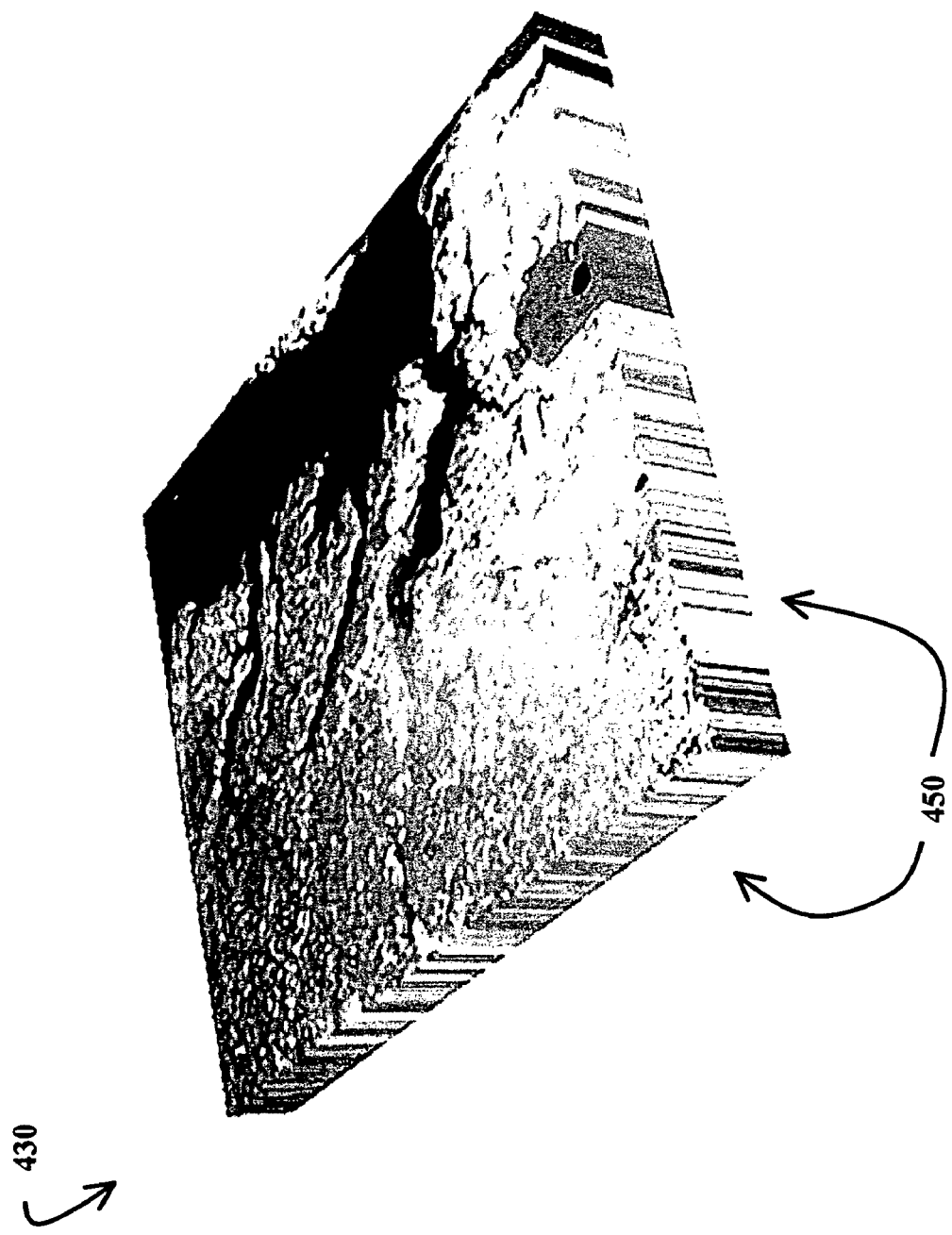
FIG. 4C depicts a Display tile including the "curtain edges" feature that is used, at least in part, to provide an efficient depiction improvement in resolution transition zones, according to an embodiment of the present invention.

Moreover, other non-limiting examples of specific features of the GVP+ 300-file structure are indicated in FIGS. 4A, 4B and 4C. For example, since a multiplicity of levels of shape and appearance data are stored with compression as indicated above, a variety of appearance files and shape files can be generated. These are (or can be) structured and addressed in such a way that they can be relocated and edited, revised, replaced and/or supplemented with higher or different resolutions, as may be needed for the user, and, when combined, the shape and appearance information (preferably along with adjacent tiles) preferably occupies a tile for display at some resolution level in the hierarchy (as represented by the shape and/or other appearance information represented by the tiles 410, 420 and/or 430 shown in FIGS. 4A, 4B, and/or 4C). Another unique feature of the GVP+ 300, in addition to the capability of specific tiles to be independently updated, is that adjacent tiles can employ data materials at different levels of resolution—there are a variety of reasons why this may occur and may be desirable. Concerning this, one important issue is that adjacent tiles constructed at differing resolutions may have imperfect edge matching (e.g., in shape and appearance). This may lead to visually distracting discontinuities in local areas defining the boundaries of such tiles. Moreover, the boundary between regions of differing resolutions generally shows vertical gaps in the terrain model. Still further, seen obliquely, as in a view from flight levels for example, the small vertical gaps are visually distracting openings in the "terrain," which may destroy the realistic nature of the visualization. To overcome this problem, the GVP+ 300 applies "curtain edges" 450 to each display tile 430 structure (as shown in FIG. 4C), and to each wireform tile 420 (as shown by the wireform tile curtain edges 425 in FIG. 4B). [ASIDE: Note only two of the "curtain edges" 450 are shown on the display tile 430 in FIG. 4C, and only two wireform tile curtain edges 425 are shown on the wireform tile 420 in FIG. 4B as well.] These "curtain edges" 450 and wireform tile curtain edges 425 are preferably formed by vertically matching the edges of each tile 430 (and 420), e.g., to the color and brightness of the appropriate and/or associated edge pixel(s). In other words, the last edge pixel's appearance is repeated along the vertical edge. And, with the "curtain edge" 450 itself blocking any see-through effect, the presence of the vertical discontinuities becomes almost undetectable, and, as a result, this new vertical tile edge treatment virtually masks any discontinuity at resolution transition boundaries in the final visualizations (as shown by the "curtain edge" treatment on the Display tile 430 in FIG. 4C).

Finally, it will be apparent to those skilled in the art of visualization system (and/or process) design (and/or other related fields) that many other modifications and/or substitutions can be made to the foregoing preferred embodiments without departing from the spirit and scope of the present invention. The preferred embodiments and the best mode of the present invention are described herein. However, it should be understood that the best mode for carrying out the invention herein described is by way of illustration and not by way of limitation. Therefore, it is intended that the scope of the present invention include all of the modifications that incorporate its principal design features, and that the scope and limitations of the present invention should be determined by the scope of the appended claims and their equivalents.

What is claimed is:

1. An information management process, comprising steps of:
acquiring data, wherein said data represents imagery, geometric, and time relationships, and wherein said data includes entity information on at least one entity, wherein said entity information comprises data on at least one of the location, speed, and direction of motion, of said at least one entity;
developing at least one database from said data, said at least one database having a Process Software Architecture capable of integrating said data;
generating at least one model, wherein said at least one model is generated at least from some portion of said data;
generating at least one visual presentation comprising at least one depiction from said at least one model; and
defining at least one object and at least one external event;
providing two-way communications with said at least one external event;
interfacing to said at least one external event, wherein said interfacing is accomplished via at least one Global Entity Manager module having a Global Entity Manager module Software Architecture, wherein each said at least one Global Entity Manager module collects information from at least one communication and at least one control process, and wherein said Global Entity Manager module Software Architecture of each said at least one Global Entity Manager module is capable of facilitating real-time viewing of said at least one visual presentation and permitting a user's areas of interest to be embedded at a pre-selected resolution;
interfacing to at least one visual display device; and
displaying said at least one object and said at least one external event on said at least one visual display device.

2. The information management process of claim 1, further comprising the steps of:
employing at least one display generation process, of at least one Render Server module, for providing world geometry, said at least one display generation process being a specialized file structure in said Process Software Architecture;
employing at least one specialized file structure in said Process Software Architecture for organizing said data;
employing said Process Software Architecture to incorporate flexible user interface provisions, various input device drivers for position and motion control, and broadly functional application programmer interface (API) features; and
generating at least one video output, wherein said generating of at least one video output is provided by at least one of said at least one Render Server module and at least one of said at least one Global Entity Manager module.

3. The information management process of claim 2, wherein each of said at least one Render Server module can generate multi-channel video outputs.

4. The information management process of claim 2, wherein each of said at least one Global Entity Manager module can generate multiple coordinated or synchronized visualizations for multiple users of said information management process regardless of said user's purpose or information process management-linked location.

5. The information management process of claim 2, wherein said at least one Global Entity Manager module assembles and tracks locations, orientation, types, activities and depiction-relevant factors for said at least one object, wherein said at least one Global Entity Manager module refines an object list for said at least one visual display, and wherein said at least one Global Entity Manager module may feed multiple copies of said information management process to match various extended visualization generation demands.

6. The information management process of claim 5 further comprising the step of:
providing replay of at least said at least one external event by utilizing at least one playback client module and at least one API interactions database, said replay combines external sources and activities initiated internally thereto for replaying at least parts of said at least one depiction on said at least one visual display, and wherein said at least one API interactions database and said at least one playback client module are used to reconstruct and manipulate at least parts of said at least one depiction.

7. The information management process of claim 1, wherein said at least one database is populated with a tile hierarchy, said tile hierarchy comprising a hierarchically ordered and combined set of at least one texture file and at least one geometry file organized in a tree structure of separate tiles, and wherein said tile hierarchy at least employs different geo-located resolution and content materials.

8. The information management process of claim 7, further comprising the step of:
compressing said at least one texture file, wherein said at least one texture file is retained in a compressed format until decompressed at least for video generation.

9. The information management process of claim 7, wherein said tile hierarchy at least employs the capabilities of: allowing specific tiles to be independently updated; and allowing adjacent tiles to employ data materials at different levels of resolution.

10. The information management process of claim 7, wherein said at least one geometry file is used to generate triangulated irregular network (TIN) files, said TIN files being comprised of polygons assembled to approximate the surface shape of terrain.

11. The information management process of claim 10, further comprising the step of:
forming curtain edges on said at least one texture file and said at least one TIN file.

12. The information management process of claim 10, wherein said at least one texture file and said TIN files have an associated data density that indicates the degree of precision in representing actual terrain, and wherein said at least one texture file and said at least one geometry file are processed for incorporation in at least one tile record file which can be selected, activated, and combined at the time of generating said at least one visual presentation on said at least one visual display.

13. The information management process of claim 12 further comprising the step of:
applying quad tree architecture to said at least one texture file and said at least one geometry file in said at least one tile record file, wherein management of both position and resolution variations within said at least one texture file and said at least one geometry file incorporated in said at least one tile record file facilitates the population of at least one worldwide database.

14. The information management process of claim 13 in which said quad architecture is expandable, wherein said quad architecture may consist of a large number of levels, and wherein said large number of levels are capable of holding information needed to match said user's needs and data precision.

15. An information management system, said information management system comprising:
- at least one data generator for providing at least one source of data, wherein said data represents imagery, geometric and time relationships to be used for generating motion paths, stored maps, location, and activity;
- memory for storing and accessing at least a portion of said data;
- at least one interface for communication between said system and at least one external device;
- at least one visualization device for displaying at least one depiction, wherein said depiction may be derived at least in part from a model, said model having at least one model input and at least one model output;
- at least one record and playback device for provision of at least one of said at least one model input to said at least one visualization device;
- software for manipulating said system, wherein said software is used to generate at least one database, wherein said software is used at least in part to create said at least one model from said database, wherein said software is used to control said at least one model input to and said at least one model output from said at least one model for use in at least said at least one display, and wherein said software is used to control said outputs from said at least one record and playback device and said at least one interface; and
- at least one information management system controller.

16. The system of claim 15, wherein said at least one interface for communication between said system and said at least one external device is at least one global entity manager, said at least one global entity manager comprising at least one software module and at least one hardware connection sufficient to interface said system to at least one source external to said system.

17. The system of claim 16 wherein said at least one visualization device is selected from the group consisting of:
- a CRT or flat-panel display;
- a single user display for unobtrusive wear upon the human body;
- a large scale projector with screen;
- a helmet-mounted display;
- a display built in to wearable optics;
- a volumetric display;
- a vehicle-mounted display;
- shutter glasses for left and right eye view control;
- a cockpit-mounted display;
- a heads-up display;
- a device that supports binocular stereopsis for true 3-D; and
- dual optics virtual displays.

* * * * *